April 15, 1924.
H. D. DOHRMAN ET AL
1,490,806
DEVICE TO FACILITATE THE PLACING OF TIRE CHAINS
Filed May 29, 1922
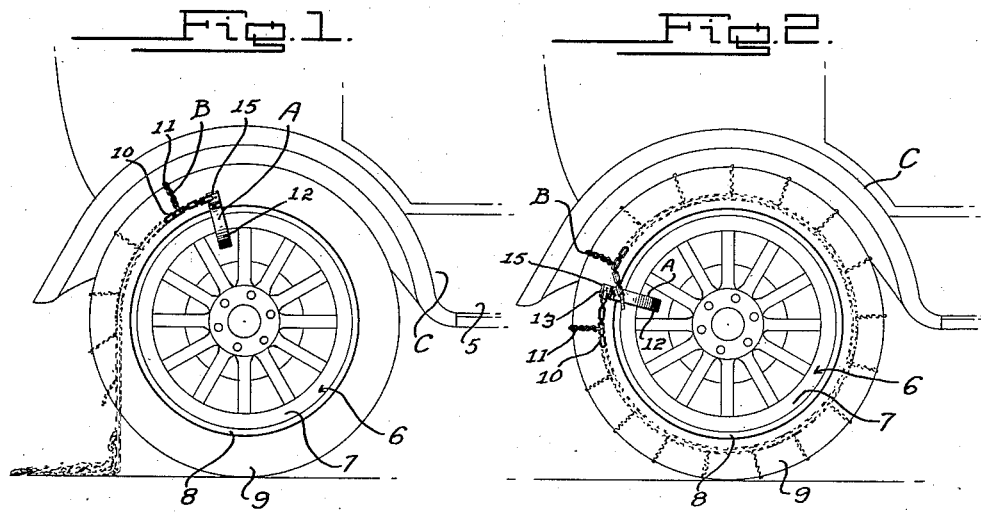
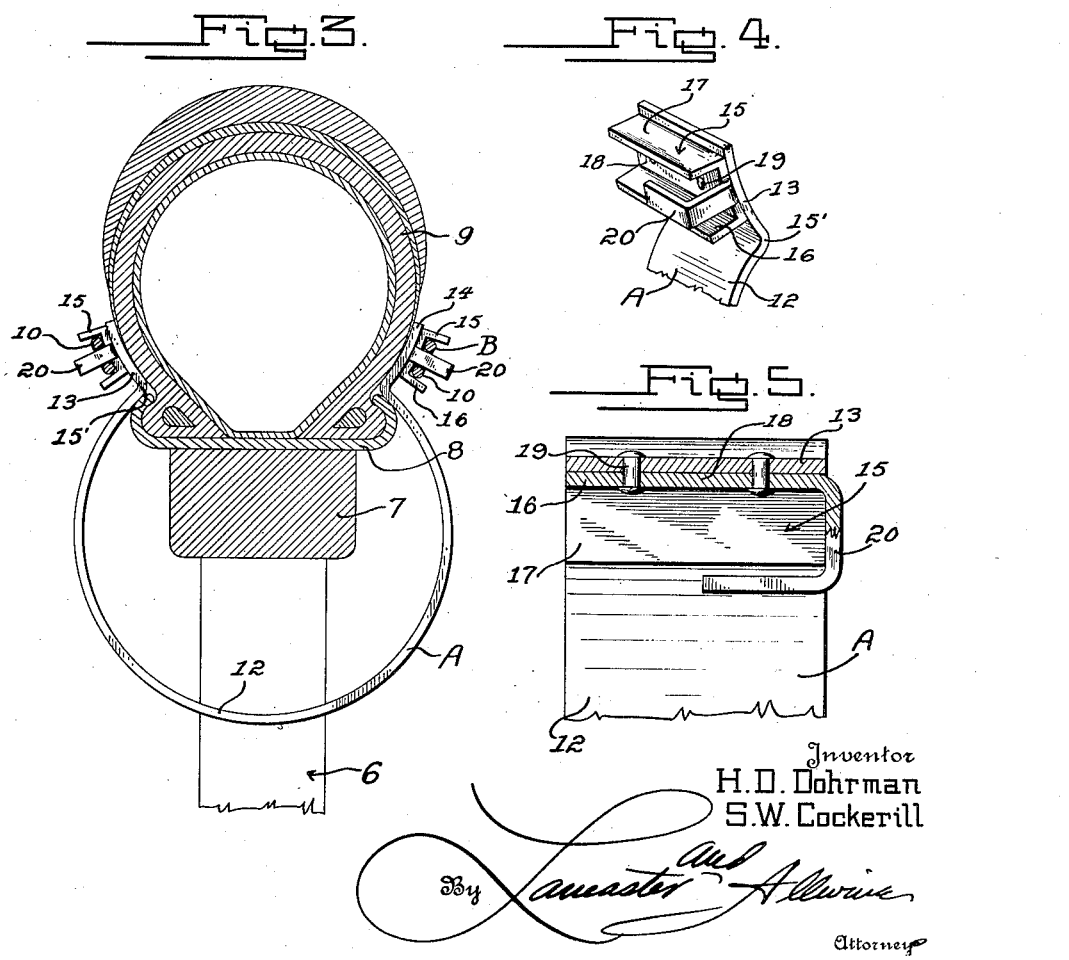
Inventor
H.D. Dohrman
S.W. Cockerill
By Lancaster and Allwine
Attorney Patented Apr. 15, 1924.

1,490,806

UNITED STATES PATENT OFFICE.

HENRY D. DOHRMAN AND SIDNEY W. COCKERILL, OF EMERSON, NEBRASKA.

DEVICE TO FACILITATE THE PLACING OF TIRE CHAINS.

Application filed May 29, 1922. Serial No. 564,513.

*To all whom it may concern:*

Be it known that we, HENRY D. DOHRMAN and SIDNEY W. COCKERILL, citizens of the United States, residing at Emerson, in the county of Dixon and State of Nebraska, have invented certain new and useful Improvements in Devices to Facilitate the Placing of Tire Chains, of which the following is a specification.

This invention relates to automobile attachments and the primary object of the invention is to provide a novel device for facilitating the placing of anti-skid chains on vehicle tires, without the necessity of jacking the vehicle up or resorting to any other time consuming method.

Another object of the invention is to provide a resilient member for detachably engaging the vehicle wheel and tire having chain receiving hooks thereon, which permit one end of the anti-skid chain to be secured to said member, so that the said end of the chain will be held in position and thus allow a vehicle to be moved forwardly a slight distance, to automatically position the chain about the wheel and tire, after which the chain terminals can be connected together and the improved device removed.

A further object of the invention is to provide an improved device for facilitating the application of anti-skid chains to vehicle tires of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary side elevation of the rear end of a motor vehicle, showing the method of attaching the improved chain applying device to a vehicle tire.

Figure 2 is a similar view, showing the position of the device and the tire chain, after the vehicle has been driven a slight distance forward.

Figure 3 is an edge elevation of the improved chain applying device, showing the same attached to a vehicle tire and wheel, the tire and wheel being shown in section.

Figure 4 is a detail perspective view of one end of an improved chain applying device.

Figure 5 is an enlarged fragmentary sectional view, through one end of the improved chain applying device, showing one of the hooks carried thereby for receiving one end of the tire chain.

Referring to the drawings in detail, wherein similar reference characters designate corresponding parts throughout the several views, the letter A generally indicates the improved tire chain applying device; B, a tire chain; and C, a vehicle. The vehicle C is of course of any preferred type or character, and has been merely shown to illustrate the use of the improved chain appliance, and as shown, the vehicle C includes the body 5, and the wheel 6. The wheel 6 consists of the usual felly 7, tire rim 8, and tire 9.

The anti-skid chain B is also of the usual construction and consists of the circumferentially extending chains 10 and the cross connecting chains 11.

The improved device A for applying the chain B to the tire 9 includes a resilient arcuate shaped body portion 12 and outwardly extending opposite disposed feet 13 and 14. The resilient body portion 12 is preferably formed of tempered spring steel and the inherent resiliency of said body normally tends to move the feet 13 and 14 toward each other. Thus, when the improved device A is applied to a wheel and tire, the feet 13 and 14 will be brought into frictional contact with the tire 9 and the rim 8. The outwardly extending feet 13 and 14 define inwardly extending shoulders 15' which are adapted to rest upon the flanges of the tire rim 8.

Each of the feet 13 and 14 carries a tire chain engaging member 15, which consists of a channel shaped body 16 for receiving the circumferential chains 10 of the anti-skidding device B. Each channel body 16 includes the laterally extending side members 17 and the connecting body portion 18. The body portions 18 are secured in any preferred manner, such as by rivets 19 to the feet 13a nd 14. One end of each of the body portions 18 of the chain receiving members 15 is provided with a hook 20, the bill of which extends in parallel relation to the body portion 18 of the chain receiving members 15.

In connecting the improved chain applying device A to a vehicle wheel and tire, the body portion 12 thereof is gripped with both hands in order to move the feet 13 and 14 away from each other and the device is slipped over the felly 7 until the feet 13 and 14 lie on opposite sides of the tire 9. The body portion 12 is then released, and the feet 13 and 14 will be forced into tight gripping contact with the opposite side walls of the tire 9, due to the body 12 tending to resume its normal position.

Now, the ends of the circumferential chains 10 at one end of the anti-skid chain are placed over the hooks 20 and the side members 17 of the chain receiving devices 15 form guides for the chains and prevent lateral movement thereof. The chain applier A is of course placed upon the rim and tire at a point rearwardly of the axle of the vehicle, and upon forward movement of the vehicle, it can be seen that the chain B will be brought around the tire, as clearly shown in Figure 2 of the drawings. The terminals of the chain B can then be hooked together in the ordinary manner and the device A removed from the wheel.

From the foregoing description, it can be seen that an exceptional simple and novel device has been provided for facilitating the application of anti-skid tire chains to vehicle wheels.

Owing to the position which the device A occupies in respect to the tire and rim of a wheel, the same can also be effectively used in connection with the chain when the vehicle is stuck in the mud to facilitate a grip being obtained by the wheel upon the road way. In this respect it will be noted that upon rotation of the wheels the device A will move the chain around into contact with the soft surface of the road to provide a grip upon the soft surface for moving the wheel therethrough.

Changes in details may be made without departing from the spirit or scope of this invention; but,

We claim:

1. A device for facilitating the application of anti-skid chains to vehicle wheels comprising a resilient substantially annular open body, outwardly extending inclined feet formed on the terminals of the body for engaging the side walls of a tire, channel shaped chain receiving members carried by the outer faces of said feet, and hooks carried by said channel shaped members having the bills thereof disposed intermediate the flanges of said channel shaped members, the hooks being adapted to receive one end of the tire chain.

2. A device of the class described including an arcuate resilient clip, a channel member at each end of the clip and hooks carried by said channel members having portions thereof extending parallel with said channel members.

3. A device for applying anti-skid chains to vehicle wheels comprising a resilient clip including an arcuate body portion, channel shaped chain link receiving members carried by the terminals of the arcuate body portion, and means for positively engaging the links disposed in the channel shaped members, said means being connected with said channel shaped members.

4. A device of the class described comprising an arcuate clip including a resilient body portion, outwardly extending tire engaging feet on said body portion, and a chain receiving hook carried by each foot having its bill disposed in parallel relation therewith and extending transversely of said body portion.

HENRY D. DOHRMAN.
SIDNEY W. COCKERILL.